(12) United States Patent
Takahara

(10) Patent No.: US 7,192,051 B2
(45) Date of Patent: Mar. 20, 2007

(54) INFLATOR

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 48 days.

(21) Appl. No.: 10/401,567

(22) Filed: Mar. 31, 2003

(65) Prior Publication Data

US 2003/0193178 A1 Oct. 16, 2003

(30) Foreign Application Priority Data

Apr. 12, 2002 (JP) .............................. 2002-111123

(51) Int. Cl.
*B60R 21/26* (2006.01)

(52) U.S. Cl. ........................ 280/736; 280/741; 280/742

(58) Field of Classification Search ................. 280/736, 280/741, 742, 729, 730.2
See application file for complete search history.

(56) References Cited

U.S. PATENT DOCUMENTS

| | | | |
|---|---|---|---|
| 5,072,966 A | | 12/1991 | Nishitake et al. |
| 5,273,309 A | * | 12/1993 | Lau et al. ................. 280/730.2 |
| 5,556,128 A | * | 9/1996 | Sinnhuber et al. ........ 280/730.2 |
| 5,709,406 A | * | 1/1998 | Buchanan ................... 280/737 |
| 5,794,973 A | * | 8/1998 | O'Loughlin et al. ........ 280/737 |
| 5,803,485 A | * | 9/1998 | Acker et al. ............. 280/728.2 |
| 5,934,705 A | * | 8/1999 | Siddiqui et al. ............ 280/736 |
| 6,089,598 A | * | 7/2000 | Snyder et al. .............. 280/740 |
| 6,149,193 A | * | 11/2000 | Canterberry et al. ........ 280/741 |
| 6,213,503 B1 | * | 4/2001 | Zimbrich et al. ........... 280/736 |
| 6,237,498 B1 | * | 5/2001 | Winterhalder et al. ...... 102/530 |
| 6,253,683 B1 | * | 7/2001 | Fukabori ..................... 102/530 |
| 6,286,863 B1 | * | 9/2001 | Kamiji et al. ............... 280/736 |
| 6,314,888 B1 | * | 11/2001 | Muller et al. ............... 102/530 |
| 6,349,964 B1 | * | 2/2002 | Acker et al. ............. 280/730.2 |
| 6,406,053 B1 | * | 6/2002 | Bayer et al. ................. 102/530 |
| 6,447,007 B1 | * | 9/2002 | DiGiacomo et al. ........ 280/741 |
| 6,626,115 B2 | * | 9/2003 | Lutz et al. .................. 102/530 |
| 6,648,370 B2 | * | 11/2003 | Koga et al. ................. 280/736 |
| 6,682,708 B1 | * | 1/2004 | Zeuner et al. .............. 422/305 |
| 6,848,708 B2 | * | 2/2005 | Green et al. ................ 280/729 |
| 2003/0057689 A1 | * | 3/2003 | Katsuda et al. ............. 280/741 |

FOREIGN PATENT DOCUMENTS

| | | |
|---|---|---|
| DE | 195 41 513 A 1 | 5/1996 |
| DE | 197 38 741 A 1 | 3/1999 |
| DE | 201 20 660 U 1 | 4/2002 |
| EP | 0 382 552 | 8/1990 |
| EP | 0 382 552 A2 | 8/1990 |
| JP | A-3-548 | 1/1991 |
| JP | A-09-183359 | 7/1997 |
| JP | 11217055 A * | 8/1999 |

(Continued)

*Primary Examiner*—Paul N. Dickson
*Assistant Examiner*—Laura B. Rosenberg
(74) *Attorney, Agent, or Firm*—Oliff & Berridge, PLC

(57) ABSTRACT

In an inflator including a plurality of gas feed portions (gas chambers for storing high-pressure gases, gas sealing plates for sealing the gas chambers, and initiators for fracturing the gas sealing plates) in a single casing, an airtight partition integrated with the casing airtightly separates the gas chambers of the gas feed portions from each other, and the casing is provided with a plurality of gas feed passages that individually communicate with the gas chambers.

21 Claims, 6 Drawing Sheets

FOREIGN PATENT DOCUMENTS

| | | | |
|---|---|---|---|
| JP | 2000233705 A * | 8/2000 | |
| JP | 2001163168 A * | 6/2001 | |
| JP | 2001225711 | 8/2001 | |
| JP | 20011225711 | 8/2001 | |
| JP | T-2001-518031 | 10/2001 | |
| JP | A-2002-544035 | 12/2002 | |
| JP | A-2003-506257 | 2/2003 | |
| WO | WO 98/39182 | 9/1998 | |
| WO | WO 00/68043 | 11/2000 | |
| WO | WO 01/10686 | 2/2001 | |

\* cited by examiner

INFLATOR

INCORPORATION BY REFERENCE

The disclosures of Japanese Patent Application No. 2002-111123 filed on Apr. 12, 2002, including the specification, drawings, and abstract is incorporated herein by reference in its entirety.

BACKGROUND OF THE INVENTION

1. Field of the Invention

The invention relates to an inflator for expanding and deploying an air bag mounted in a vehicle or the like by supplying the air bag with gas.

2. Description of the Related Art

One inflator of this kind includes a plurality of gas feed portions in a single casing (also referred to as a housing), for example, as disclosed in Japanese Patent Application Laid-Open No. 11-217055. In an inflator disclosed in this publication, gas feed portions include gas chambers (combustion chambers) formed in a casing, gas generating agents accommodated in the gas chambers, filter members surrounding the gas generating agents in the casing, and initiators (igniters) for igniting and burning the gas generating agents, respectively.

In the inflator of the related art described above, although partition members separate the casing into the gas chambers, the gas chambers communicate with one another via the filter members. Therefore, gases generated in the gas chambers in the casing (i.e., gases generated by igniting and burning the gas generating agents) affect one another. This makes it difficult to obtain a desired gas output characteristic.

SUMMARY OF THE INVENTION

It is an object of the invention to provide an inflator that is capable of inhibiting gases generated in gas chambers in a casing from affecting one another and suitably adjusting gas output characteristics.

The invention provides an inflator including a plurality of gas feed portions in a single casing. In a first aspect of the invention, an airtight partition formed in the casing airtightly separates gas chambers of the gas feed portions from one another, and the casing is provided with a plurality of gas feed passages that individually communicate with the gas chambers.

In the inflator according to the first aspect described above, gases are supplied through the gas feed passages from the gas chambers respectively, which are airtightly separated from one another by the airtight partition in the casing. Therefore, the gases that are supplied from the gas chambers to the gas feed passages respectively in the casing do not affect one another, and suitable outputs can be individually obtained in the gas feed portions. As a result, a desired gas output characteristic can be obtained in the inflator as a whole. Further, since the airtight partition formed in the casing also serves to enhance rigidity (strength) of the casing, it is also possible to achieve a reduction in size or weight of the casing.

In the first aspect described above, the airtight partition may be integrated with the casing. In this arrangement, since the airtight partition is integrated with the casing, no local stress arises as opposed to a case where the airtight partition is formed as a separate member and is stuck to the casing. It is therefore possible to achieve a reduction in size or weight of the casing while maintaining rigidity of the airtight partition.

Further, the airtight partition may be thicker in its joining portion (peripheral edge portion) to be joined to an outer wall of the casing than in its central portion. In this arrangement, since the airtight partition is thicker in its joining portion (peripheral edge portion) to be joined to the outer wall of the casing than in its central portion, it is possible to enhance a coupling strength between the airtight partition and the outer wall of the casing, and to improve durability of a coupling portion between the airtight partition and the outer wall of the casing.

The gas feed portions may have different gas outputs. In this arrangement, since the gas feed portions have different gas outputs, it is possible to obtain with ease a gas output characteristic widely ranging from low outputs to high outputs.

The gas feed portions may include gas generating means for generating different kinds of gases. In this arrangement, the gas output characteristic of the inflator can be easily adjusted by changing the kinds of gases in the gas feed portions.

The gas feed portions may include gas generating means for generating gases that are different in volume. In this arrangement, the gas output characteristic of the inflator can be easily adjusted by changing the volumes of gases in the gas feed portions.

The gas feed portions may include gas generating agents for generating vaporized gases that are different in number of moles. In this arrangement, the gas output characteristic of the inflator can be easily adjusted by changing amounts or the like of the gas generating agents to be used.

High-pressure gases may be sealed in the gas chambers of the gas feed portions. In this arrangement, since high-pressure gases are sealed in the gas chambers of the gas feed portions, no foreign matters such as burnt debris (unnecessary substances that are produced, for example, in the case where a gas generating agent for generating a vaporized gas through combustion incompletely burns) mix with the gases that are supplied from the gas chambers through the gas feed passages respectively.

The gas feed portions may be adapted to be activated at different timings. In this arrangement, by differentiating timings for activating the gas feed portions from one another, gas output characteristics of the gas feed portions can be obtained in a superimposed manner with a time difference. Thus, timings for activating the gas feed portions are adjusted and controlled, whereby a desired gas output characteristic can be achieved through simple adjustment and control of the gas characteristic of the inflator.

Each of the gas feed passages may communicate with at least one of front-seat and rear-seat expansion chambers of a curtain air bag that is adapted to protect heads of front-seat and rear-seat occupants of a vehicle. In this arrangement, timings for activating the gas feed portions are adjusted and controlled, whereby characteristics of expanding and deploying the front-seat expansion chamber and the rear-seat expansion chamber of the curtain air bag can be individually controlled. It is therefore possible to expand and deploy the curtain air bag in various expansion and deployment modes, and to reliably protect the heads of front-seat and rear-seat occupants of the vehicle.

Each of the gas feed passages may communicate with at least one of thoracic-part and lumber-part expansion chambers of a side air bag that is adapted to protect side parts of an occupant of a vehicle. In this arrangement, timings for activating the gas feed portions are adjusted and controlled, whereby characteristics of expanding and deploying the lumbar-part and thoracic-part expansion chambers of the side air bag can be individually controlled. It is therefore possible to expand and deploy the side air bag in various expansion and deployment modes, and to reliably protect thoracic and lumbar parts of an occupant of the vehicle.

Each of the gas feed passages may communicate with at least one of a plurality of expansion chambers of a multiple air bag that is mounted in a vehicle. In this arrangement, timings for activating the gas feed portions are adjusted and controlled, whereby characteristics of expanding and deploying the expansion chambers of the multiple air bag can be individually controlled. It is therefore possible to expand and deploy the multiple air bag in various expansion and deployment modes, and to reliably protect occupants of the vehicle.

DETAILED DESCRIPTION OF PREFERRED EMBODIMENTS

Figure 1:
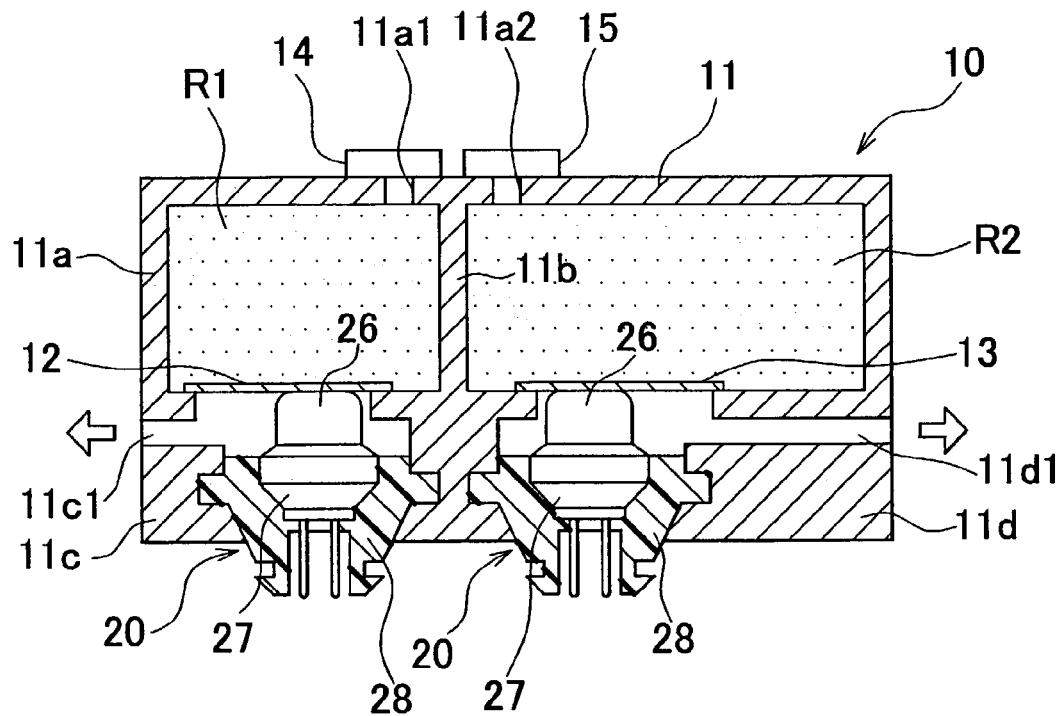
FIG. 1 is a longitudinal cross-sectional side view schematically showing an inflator in accordance with one embodiment of the invention.

Hereinafter, the embodiments of the invention will be described with reference to the drawings. FIG. 1 schematically shows an inflator 10 in accordance with one embodiment of the invention. The inflator 10 of this embodiment includes a single casing 11, a pair of gas sealing plates 12, 13 mounted in the casing 11, and a pair of initiators 20.

The casing 11 has an outer wall 11a, an airtight partition 11b, and a pair of attachment portions 11c, 11d that also serve as part of the outer wall. The gas sealing plates 12, 13 and the initiators 20 are attached to the attachment portions 11c, 11d respectively. Gas feed passages 11c1, 11d1 are formed in the attachment portions 11c, 11d. A peripheral edge portion of the airtight partition 11b is integrally joined to the outer wall 11a and the attachment portions 11c, 11d. Thus, the airtight partition 11b is integrally formed in the casing 11 and airtightly separates a pair of small and large gas chambers R1, R2 from each other in the casing 11.

A high-pressure gas contained in the gas chamber R1 is different in quantity and pressure from a high-pressure gas contained in the gas chamber R2. These gases are sealed into and fill the gas chambers R1, R2 through injection holes 11a1 11a2 formed through the outer wall 11a, respectively. The injection holes 11a1, 11a2 are airtightly closed by plugs 14, 15 respectively, which can be removed from the outer wall 11a.

The gas sealing plates 12, 13 are airtightly mounted in the casing 11. Each of the gas sealing plates 12, 13 can be fractured through initiation of a corresponding one of the initiators 20. If the gas sealing plates 12, 13 are not fractured, high-pressure gases are stored in the gas chambers R1, R2 of the casing 11. If the gas sealing plates 12, 13 are fractured, high-pressure gases are injected and supplied into an air bag (not shown) from the gas chambers R1, R2 through the gas feed passages 11c1, 11d1 that are formed in the attachment portions 11c, 11d respectively.

Figure 2:
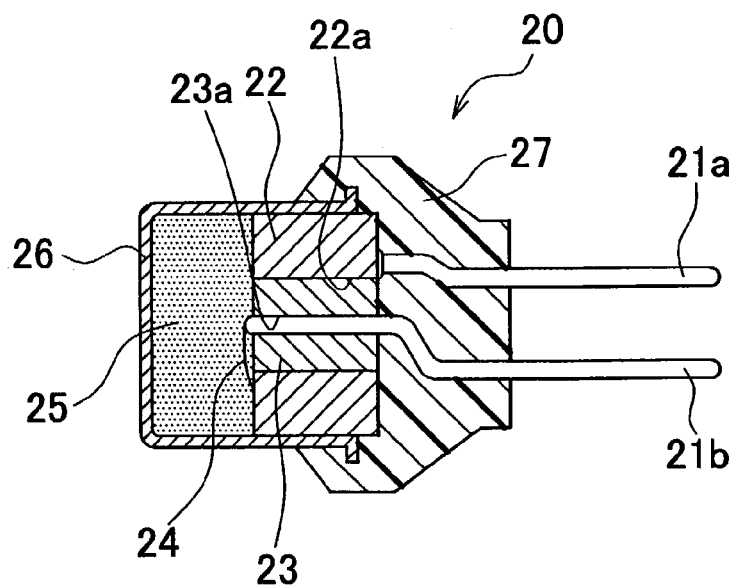
FIG. 2 is an enlarged cross-sectional view of an essential portion of one of initiators shown in FIG. 1.

Each of the initiators 20 includes components that are shown in FIG. 2 on an enlarged scale, namely, a pair of lead pins 21a, 21b, a conductive header 22, an insulating member 23, a bridge line 24, a gunpowder 25, a case 26, a resin mold 27, and the like. Each of the initiators 20 also includes components such as a resin holder 28 for mounting the components shown in FIG. 2 to the inflator 10 as shown in FIG. 1. Electrization of the initiators 20 is controlled by an electrization control unit (not shown).

The lead pin 21a is an electrode that is integrally mounted to the conductive header 22. The lead pin 21b is an electrode that is integrally mounted to the conductive header 22 via the insulating member 23. The conductive header 22 is made of a conductive metal and has a cylindrical shape. An inner hole 22a is formed in a central portion of the conductive header 22.

The insulating member 23 has a cylindrical shape. An insertion hole 23a is formed in an axial center of the insulating member 23. The lead pin 21b is tightly fitted into the insertion hole 23a so as to be coaxially fixed therein. The insulating member 23 is made of a heat-resistant, pressure-resistant glass, and is tightly fitted into the inner hole 22a of the conductive header 22 so as to be coaxially fitted therein.

The bridge line 24 is connected to the lead pin 21b and the conductive header 22 so that the lead pin 21a is indirectly connected to the lead pin 21b. By being electrized through the lead pins 21a, 21b, the bridge line 24 fires and initiates the gunpowder 25. The gunpowder 25 and the bridge line 24 are accommodated in the case 26 in a sealed state. Part of the gunpowder 25 is in contact with bridge line 24.

The case 26 is made of a thin metal plate, and is formed in the shape of a cup. A bottom portion of the case 26 can be fractured through initiation of the gunpowder 25. An opening end portion of the case 26 is airtightly stuck to an outer periphery of the conductive header 22 by means of welding or the like. The resin mold 27 is molded in such a manner as to integrate coupling portions of the components such as the lead pins 21a, 21b, the conductive header 22, the insulating member 23, and the case 26. The resin holder 28 is molded with the components shown in FIG. 2 being mounted to the casing 11.

In the inflator 10 of this embodiment arranged as described above, if the bridge line 24 installed in the left one of the initiators 20 in FIG. 1 is electrized in response to electrization of that initiator 20, an initiating agent 25 fires and explodes, and the bottom portion of a metal capsule 26 is fractured. As a result, the gas sealing plate 12 is also fractured, and the high-pressure gas stored in the gas chamber R1 of the casing 11 is injected and supplied into the air bag (not shown) through the gas feed passage 11c1 formed in the attachment portion 11c.

On the other hand, if the bridge line 24 installed in the right one of the initiators 20 in FIG. 1 is electrized in response to electrization of that initiator 20, the initiating agent 25 fires and explodes, and the bottom portion of the metal capsule 26 is fractured. As a result, the gas sealing plate 13 is also fractured, and the high-pressure gas stored in the gas chamber R2 of the casing 11 is injected and supplied into the air bag (not shown) through the gas feed passage 11d1 formed in the attachment portion 11d.

Figure 3:
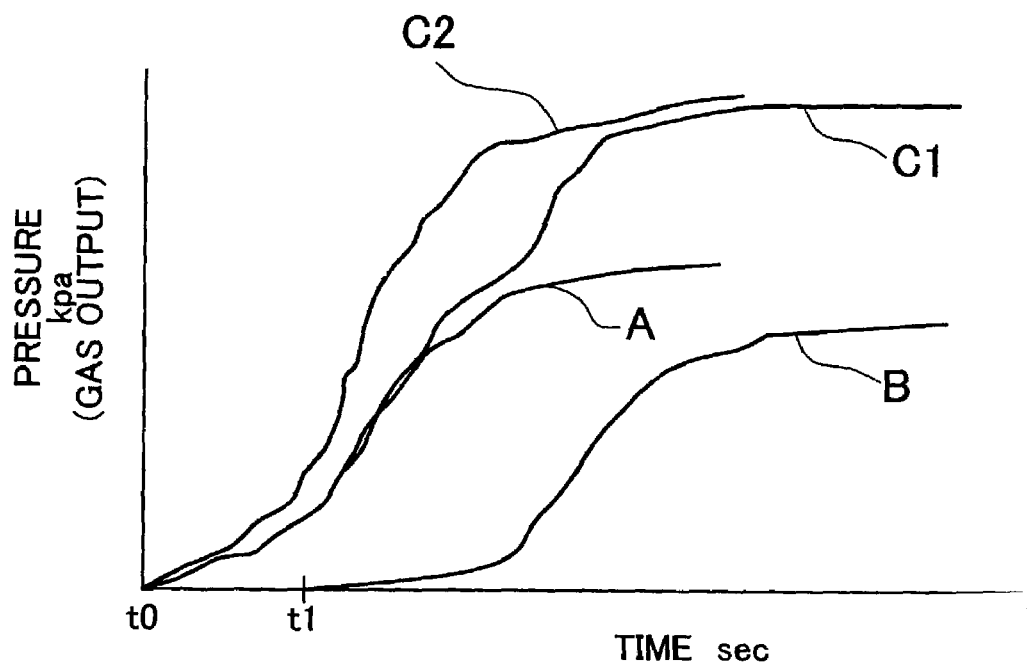
FIG. 3 is a graph of characteristic curves showing gas output characteristics of the inflator shown in FIG. 1.

A gas output characteristic obtained through electrization and initiation of the left one of the initiators 20 in FIG. 1 (i.e., a characteristic obtained through operation of a left gas feed portion that is composed of the left initiator 20, the gas sealing plate 12, the high-pressure gas in the gas chamber R1, the gas feed passage 11c1, and the like) changes as indicated by a characteristic curve B shown in FIG. 3. A gas output characteristic obtained through electrization and initiation of the right one of the initiators 20 in FIG. 1 (i.e., a characteristic obtained through operation of a right gas feed portion that is composed of the right initiator 20, the gas sealing plate 13, the high-pressure gas in the gas chamber R2, the gas feed passage 11d1, and the like) changes as indicated by a characteristic curve A shown in FIG. 3. According to the characteristic curve A, electrization of the right one of the initiators 20 in FIG. 1 is started at $t_0$ (a timing for activation). According to the characteristic curve B, electrization of the left one of the initiators 20 in FIG. 1 is started at t1 (a timing for activation).

In the inflator 10 of this embodiment, therefore, if electrization of the right and left ones of the initiators 20 shown in FIG. 1 is started at $t_0$ and t1 respectively, the gas output characteristic A obtained through electrization and initiation of the right one of the initiators 20 in FIG. 1 and the gas output characteristic B obtained through electrization and initiation of the left one of the initiators 20 in FIG. 1 are obtained in a superimposed manner with a time difference (t1–$t_0$). As a result, a gas output characteristic indicated by a characteristic curve C1 in FIG. 3 is obtained in the inflator 10 as a whole.

If electrization of the left and right initiators 20 is simultaneously started at $t_0$, the gas output characteristics A, B are obtained with no time difference. As a result, a gas output characteristic indicated by a characteristic curve C2 in FIG. 3 is obtained in the inflator 10 as a whole. Thus, by adjusting and controlling a timing when electrization of each of the initiators 20 is started (i.e., a timing for activation), it becomes possible to ensure the inflator 10 of a gas output characteristic widely ranging from low outputs (the gas output characteristic B) to high outputs (the gas output characteristic C2), and to realize a desired gas output characteristic through simple adjustment and control.

In the inflator 10 of this embodiment, gases are supplied to the air bag through the gas feed passages 11c1, 11d1 from the gas chambers R1, R2 respectively, which are airtightly separated from each other by the airtight partition 11b in the casing 11. Thus, the gases that are supplied from the gas chambers R1, R2 to the gas feed passages 11c1, 11d1 respectively in the casing 11 do not affect each other, and a suitable output can be individually obtained in each of the left and right gas feed portions. Therefore, a desired gas output characteristic (e.g., the gas output characteristic C1 or C2) can be obtained in the inflator 10 as a whole.

Because the airtight partition 11b in the casing 11 also serves to enhance rigidity (strength) of the casing 11, it is also possible to achieve a reduction in size or weight of the casing 11. Further, because the airtight partition 11b is integrated with the casing 11, no local stress arises as opposed to a case where the airtight partition 11b is formed as a separate member and is stuck to the casing 11. It is therefore possible to achieve a reduction in size or weight of the casing 11 while maintaining rigidity of the airtight partition 11b. These effects grow as the gases that are sealed into and fill the gas chambers R1, R2 of the casing 11 increase in pressure.

In the inflator 10 of this embodiment, since the high-pressure gases are sealed in the gas chambers R1, R2 of the left and right gas feed portions, no foreign matters such as burnt debris (unnecessary substances that are produced, for example, in the case where a gas generating agent for generating a vaporized gas through combustion incompletely burns) mix with the gases that are supplied from the gas chambers R1, R2 through the gas feed passages 11c1, 11d1 respectively.

Figure 4:
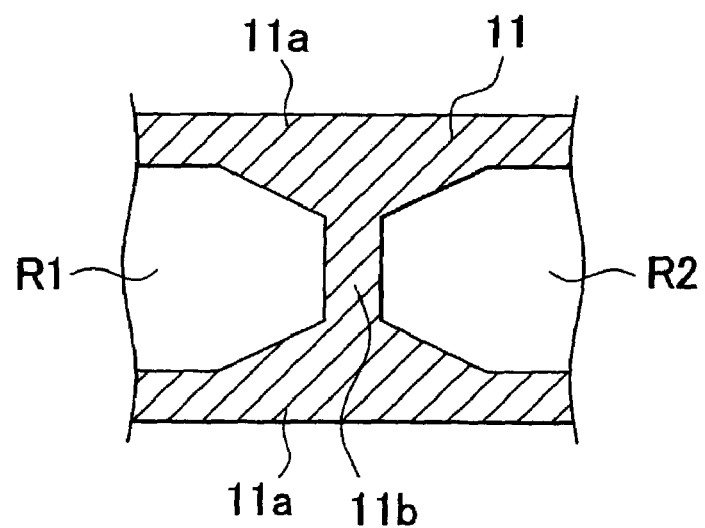
FIG. 4 is a partial cross-sectional view of an airtight partition of the inflator in accordance with a modified embodiment of the invention.
Figure 5:
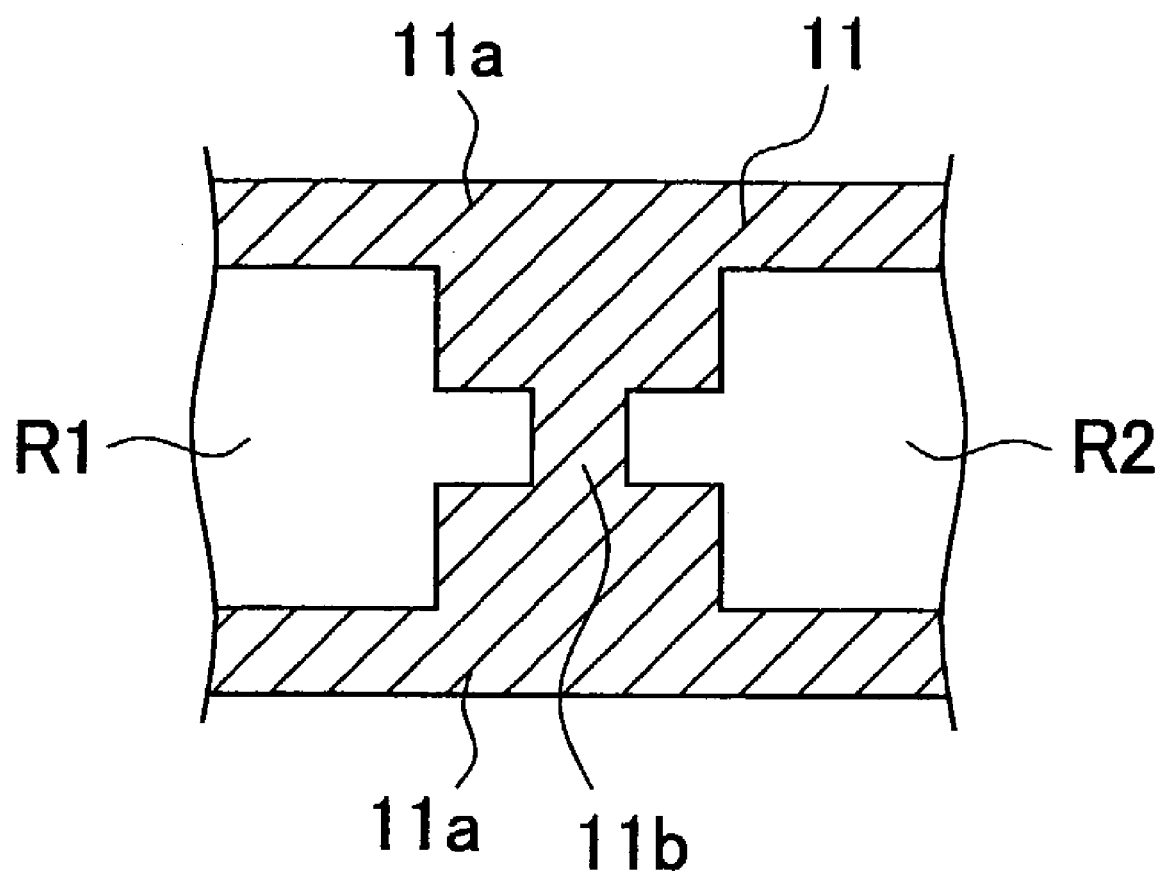
FIG. 5 is a partial cross-sectional view of an airtight partition of the inflator in accordance with another modified embodiment of the invention.

In the embodiment described above, the airtight partition 11b has a substantially equal thickness both in its joining portion (peripheral edge portion) to be joined to the outer wall 11a and in its central portion as shown in FIG. 1. As schematically shown in FIG. 4 or FIG. 5, however, the airtight partition 11b may be thicker in its joining portion (the peripheral edge portion) to be joined to the outer wall 11a than in its central portion. In this case, it is possible to enhance a coupling strength between the airtight partition 11b and the outer wall 11a, and to improve durability of a coupling portion between the airtight partition 11b and the outer wall 11a.

Figure 6:
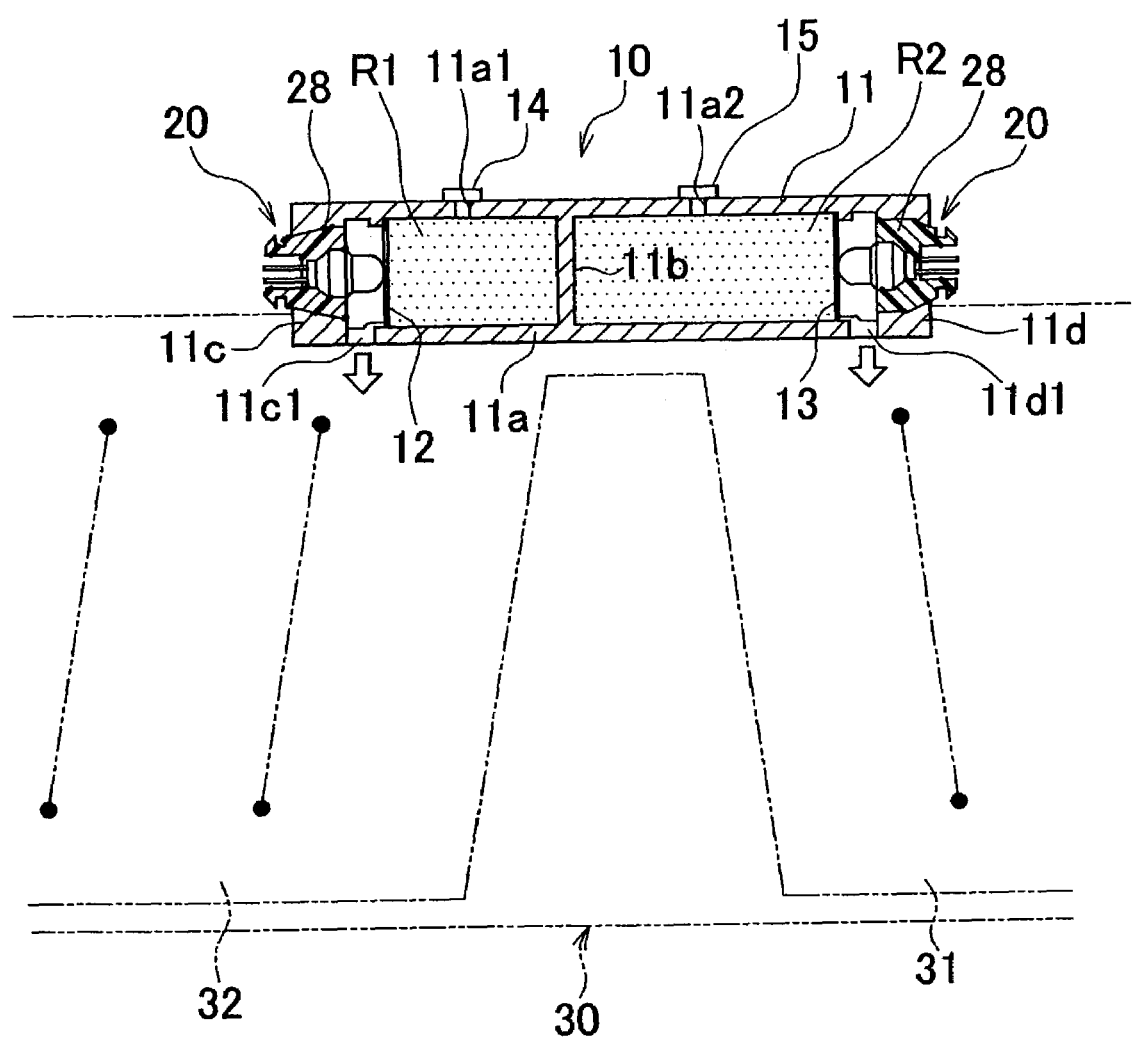
FIG. 6 is a longitudinal cross-sectional side view schematically showing an embodiment in which the inflator of the invention is used in combination with a curtain air bag.

FIG. 6 shows the inflator 10 in accordance with another embodiment of the invention. In the inflator 10 of this embodiment, each of the initiators 20 is attached to a corresponding one of left and right end portions of the casing 11 that is formed in a laterally elongated manner. Because the arrangement of the inflator 10 is identical in other respects with the corresponding arrangement of the inflator 10 shown in FIG. 1, like members are denoted by like reference symbols, and repetition of the same description will be avoided.

In the inflator 10 shown in FIG. 6, the casing 11 is laterally elongated. Therefore, the inflator 10 is suited to be adopted as an inflator for a curtain air bag 30 that is schematically indicated by a fictitious line in FIG. 6. The curtain air bag 30 shown in FIG. 6 is adapted to protect heads of front-seat and rear-seat occupants of a vehicle, and includes a front-seat expansion chamber 31 and a rear-seat expansion chamber 32. A gas is supplied to the front-seat expansion chamber 31 from the gas chamber R2 through the gas feed passage 11d1. A gas is supplied to the rear-seat expansion chamber 32 from the gas chamber R1 through the gas feed passage 11c1.

In the inflator 10 shown in FIG. 6 and arranged as described above, timings for activating the left and right initiators 20 are adjusted and controlled, whereby characteristics of expanding and deploying the front-seat and rear-seat expansion chambers 31, 32 of the curtain air bag 30 can be individually controlled. It is therefore possible to expand and deploy the curtain air bag 30 in various expansion and deployment modes, and to reliably protect the heads of front-seat and rear-seat occupants of the vehicle.

Figure 7:
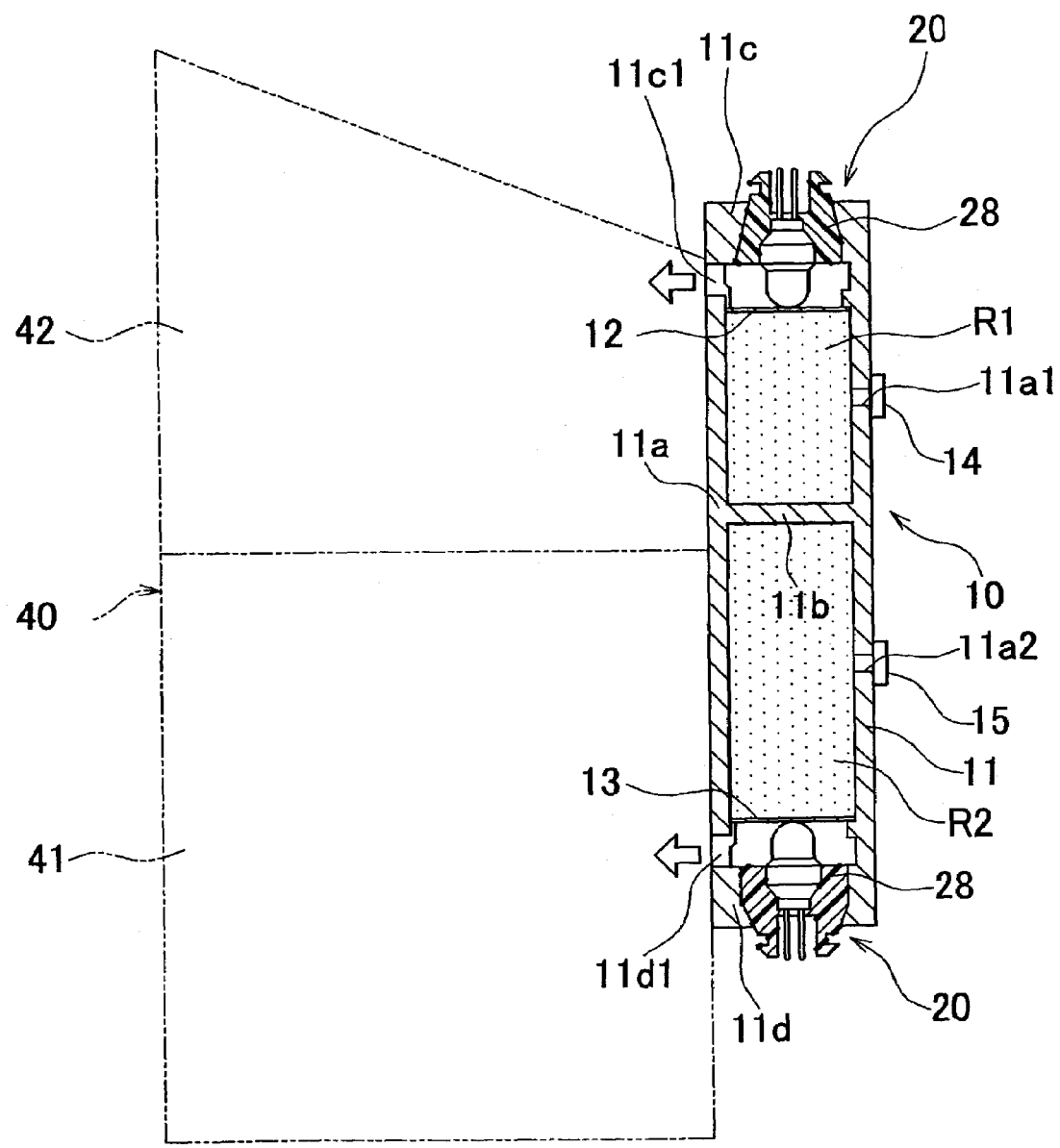
FIG. 7 is a longitudinal cross-sectional side view schematically showing an embodiment in which the inflator of the invention is used in combination with a side air bag.
Figure 8:
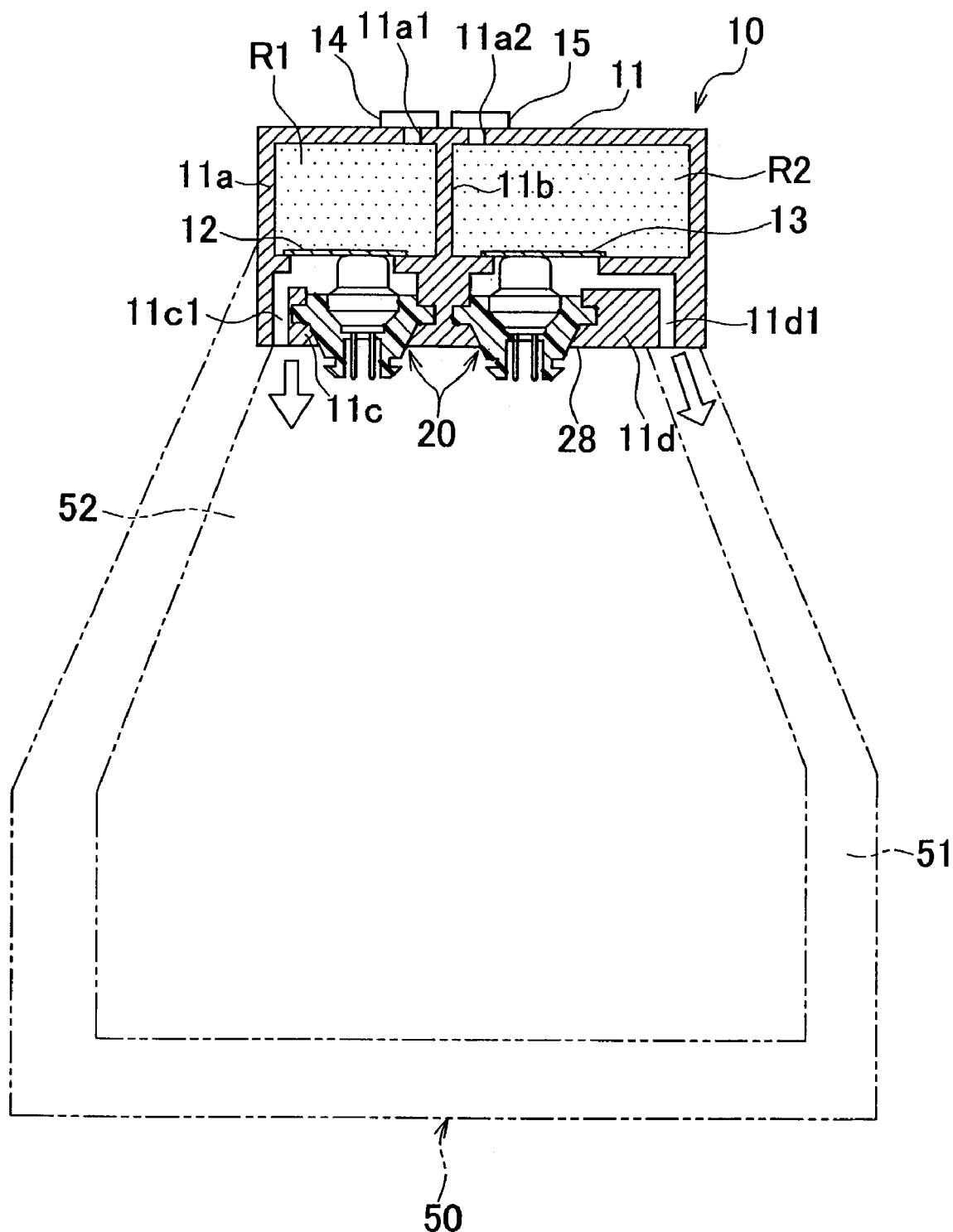
FIG. 8 is a longitudinal cross-sectional side view schematically showing an embodiment in which the inflator of the invention is used in combination with a multiple air bag.

In the embodiment described above (i.e., the embodiment shown in FIG. 6), the inflator 10 of the invention is used in combination with the curtain air bag 30 that is adapted to protect heads of front-seat and rear-seat occupants of a vehicle. As shown in FIG. 7 or FIG. 8, however, the inflator 10 of the invention may also be used in combination with a side air bag 40 that is adapted to protect side parts of an occupant of a vehicle, or with a multiple air bag 50.

The inflator 10 shown in FIG. 7 is substantially identical in arrangement with the inflator 10 shown in FIG. 6, except that the former is vertically disposed. A gas is supplied from the gas chamber R2 through the gas feed passage 11d1 to a lumbar-part expansion chamber 41 of the side air bag 40, which is schematically indicated by a fictitious line in FIG. 7. A gas is supplied from the gas chamber R1 through a gas feed passage 11c1 to a thoracic-part expansion chamber 42 of the side air bag 40.

In the inflator 10 shown in FIG. 7 and arranged as described above, timings for activating the upper and lower ones of the initiators 20 are adjusted and controlled, whereby characteristics of expanding and deploying the lumbar-part and thoracic-part expansion chambers 41, 42 of the side air bag 40 can be individually controlled. It is therefore possible to expand and deploy the side air bag 40 in various expansion and deployment modes, and to reliably protect thoracic and lumbar parts of occupants of the vehicle.

The inflator 10 shown in FIG. 8 is substantially identical in arrangement with the inflator 10 shown in FIG. 1, except that the gas feed passages 11c1, 11d1 of the former are different in opening direction from those of the latter. A gas is supplied from the gas chamber R2 through the gas feed passage 11d1 to an outer expansion chamber 51 of a multiple air bag 50 that is schematically indicated by a fictitious line in FIG. 8. A gas is supplied from the gas chamber R1 through the gas feed passage 11c1 to an inner expansion chamber 52 of the multiple air bag 50.

In the inflator 10 shown in FIG. 8 and arranged as described above, timings for activating the left and right initiators 20 are adjusted and controlled, whereby characteristics of expanding and deploying the expansion chambers 51, 52 of the multiple air bag 50 can be individually controlled. It is therefore possible to expand and deploy the multiple air bag 50 in various expansion and deployment modes, and to reliably protect occupants of the vehicle.

The embodiments described above (i.e., the embodiments described with reference to FIGS. 1 to 8) are implemented with an arrangement in which the gas feed portions include the gas chambers R1, R2 for storing high-pressure gases, the gas sealing plates 12, 13 for sealing the gas chambers R1, R2, and the initiators 20 for fracturing the gas sealing plates 12, 13, respectively. However, these embodiments can also be implemented with an arrangement in which the gas feed portions include gas generating chambers (which are substantially identical with the gas chambers R1, R2 respectively) and gas generating agents that are accommodated in the gas generating chambers and that are ignited through initiation of the initiators 20 so as to generate gases, respectively.

In this case, the embodiments can also be implemented with different kinds of gas generating agents (including those which generate vaporized gases that are different in number of moles) or with different capacities for gas generating agents (i.e., with different amounts of gas generating agents being used). The embodiments can also be implemented with a high-pressure gas being stored in one of the gas chambers R1 or R2 and with a gas generating agent being accommodated in the other gas chamber R2 or R1.

Although the embodiments described above are implemented with an arrangement in which the inflator 10 includes the two gas feed portions, they can also be implemented with an arrangement in which the inflator includes three or more gas feed portions.

What is claimed is:

1. An inflator, comprising:
   a single casing;
   a first and a second gas feed portions provided in the single casing, the first gas feed portion is different from the second gas feed portion;
   an airtight partition formed in the casing airtightly separates gas chambers of the gas feed portions from one another; and
   a first gas feed passage and a second gas feed passage provided in the casing, wherein:
   the first gas feed passage connects the first gas feed portion and a first expansion chamber of a plurality of expansion chambers in a curtain air bag;
   the second gas feed passage connects the second gas feed portion and a second expansion chamber of the plurality of expansion chambers in the curtain air bag, the second expansion chamber is different from the first expansion chamber;
   each of the gas feed passages individually communicates with at least one of front-seat and rear-seat expansion chambers of the curtain air bag that is adapted to protect heads of front-seat and rear-seat occupants of a vehicle; and
   a maximum gas output of the gas feed portion that supplies gas to the gas passage communicating with the front-seat expansion chamber is higher than a maximum gas output of the gas feed portion that supplies gas to the gas passage communication with the rear-seat expansion chamber.

2. The inflator according to claim 1, wherein the airtight partition is thicker in its joining portion to be joined to an outer wall of the casing than in its central portion.

3. The inflator according to claim 1, wherein the gas feed portions have different gas outputs.

4. The inflator according to claim 3, wherein the gas feed portions include gas generating means for generating different gases.

5. The inflator according to claim 3, wherein the gas feed portions include gas generating means for generating gases that are different in volume.

6. The inflator according to claim 3, wherein the gas feed portions include gas generating agents for generating vaporized gases that are different in number of moles.

7. The inflator according to claim 1, wherein high-pressure gases are sealed in the gas chambers of the gas feed portions.

8. The inflator according to claim 1, wherein the gas feed portions can be activated at different timings.

9. The inflator according to claim 1, wherein each of the plurality of the gas feed portions includes an igniter that fires by an electrization and communicates with the gas chamber and the gas feed passage.

10. The inflator according to claim 9, wherein gas generating agents that are ignited through initiation of the igniter are sealed in the gas chambers of the gas feed portions.

11. The inflator according to claim 1, wherein the gas chambers comprise a large gas chamber connected to the front-seat expansion chamber; and a small gas chamber connected to the rear-seat expansion chamber.

12. An inflator, comprising:
   a single casing;
   a first and a second gas feed portions provided in the single casing, the first gas feed portion is different from the second gas feed portion;
   an airtight partition formed in the casing airtightly separates gas chambers of the gas feed portions from one another; and
   a first gas feed passage and a second gas feed passage provided in the casing, wherein:

the first gas feed passage connects the first gas feed portion and a first expansion chamber of a plurality of expansion chambers in a multiple air bag;

the second gas feed passage connects the second gas feed portion and a second expansion chamber of the plurality of expansion chambers in the multiple air bag, the second expansion chamber is different from the first expansion chamber;

each of the gas feed passages individually communicates with at least one of a plurality of expansion chambers of the multiple air bag that is mounted in a vehicle; and a maximum gas output of the gas feed portion that supplies gas to the gas passage communicating with an outer expansion chamber of the multiple air bag is higher than a maximum gas output of the gas feed portion that supplies gas to the gas passage communication with an inner chamber expansion chamber of the multiple air bag.

13. The inflator according to claim 12, wherein the airtight partition is thicker in its joining portion to be joined to an outer wall of the casing than in its central portion.

14. The inflator according to claim 12, wherein the gas feed portions have different gas outputs.

15. The inflator according to claim 14, wherein the gas feed portions include gas generating means for generating different gases.

16. The inflator according to claim 14, wherein the gas feed portions include gas generating means for generating gases that are different in volume.

17. The inflator according to claim 14, wherein the gas feed portions include gas generating agents for generating vaporized gases that are different in number of moles.

18. The inflator according to claim 12, wherein high-pressure gases are sealed in the gas chambers of the gas feed portions.

19. The inflator according to claim 12, wherein the gas feed portions can be activated at different timings.

20. The inflator according to claim 12, wherein each of the plurality of the gas feed portions includes an igniter that fires by an electrization and communicates with the gas chamber and the gas feed passage.

21. The inflator according to claim 20, wherein gas generating agents that are ignited through initiation of the igniter are sealed in the gas chambers of the gas feed portions.

* * * * *